United States Patent
Shemer et al.

(10) Patent No.: US 6,319,539 B1
(45) Date of Patent: Nov. 20, 2001

(54) FIBROUS FOOD PRODUCT AND METHOD AND DEVICE FOR ITS PRODUCTION

(75) Inventors: Michael Shemer, Abuza; Gil Arbel; Israela Bait-Halachmy, both of Haifa; Yoel Arad, Upper Galilee, all of (IL)

(73) Assignee: Tivall (1993) Ltd., Oshrat (IL)

( * ) Notice: Subject to any disclaimer, the term of this patent is extended or adjusted under 35 U.S.C. 154(b) by 0 days.

(21) Appl. No.: 09/508,596

(22) PCT Filed: Sep. 17, 1998

(86) PCT No.: PCT/IL98/00457

§ 371 Date: Jun. 7, 2000

§ 102(e) Date: Jun. 7, 2000

(87) PCT Pub. No.: WO99/13735

PCT Pub. Date: Mar. 25, 1999

(30) Foreign Application Priority Data

Sep. 17, 1997 (IL) .................................................. 121786

(51) Int. Cl.[7] ............................................. A23J 3/14; A23J 3/26
(52) U.S. Cl. ............................. 426/656; 426/448; 426/449; 426/450; 426/452; 426/516; 426/57; 99/367; 99/368
(58) Field of Search ...................... 426/656, 448, 426/449, 450, 452, 516, 517; 99/367, 368

(56) References Cited

U.S. PATENT DOCUMENTS

| | | | |
|---|---|---|---|
| 3,814,823 | * | 6/1974 | Yang et al. .......................... 426/362 |
| 4,287,219 | * | 9/1981 | Fabre .................................. 426/276 |
| 4,615,901 | * | 10/1986 | Yoshioka et al. ................... 426/656 |
| 4,910,040 | * | 3/1990 | Sagarino et al. ................... 426/656 |
| 5,061,507 | * | 10/1991 | Aulik et al. ......................... 426/637 |
| 5,534,278 | | 7/1996 | De Ruyter et al. ................ 426/237 |
| 5,593,717 | * | 1/1997 | Huber et al. ........................ 426/656 |
| 6,001,412 | * | 12/1999 | Huber et al. ........................ 426/656 |

FOREIGN PATENT DOCUMENTS

| | | |
|---|---|---|
| 0 190 873 | 8/1986 | (EP) . |
| 0 262 276 | 4/1988 | (EP) . |
| 0 398 315 | 11/1990 | (EP) . |
| 2 705 534 | 12/1994 | (FR) . |
| 80207/3 | 9/1986 | (IL) . |
| WO 96/36242 | 11/1996 | (WO) . |

OTHER PUBLICATIONS

Cheftel, J.C. et al., New Protein Texturization Processes by Extrusion Cooking at High Moisture Levels, Food Review Int'l. pp. 235–272 (1992).
Challenges IPA de l'Innovation (1994).
IPA 1996 Palmares.

* cited by examiner

*Primary Examiner*—Nina Bhat
(74) *Attorney, Agent, or Firm*—Gary M. Nath; Joshua B. Goldberg; Nath & Associates PLLC (57) ABSTRACT

A food product comprising continuous aligned bundles of formed fibers extending between faces of the food product is provided. The fibers in this food product are newly formed and fixed during its preparation. This novel food product may be prepared by forcing dough to move along an axis extending through a passageway toward an axial opening at a far end of the passageway, while transferring heat to at least that portion of the moving dough proximal said second end and controlling the heat transfer and speed of movement of the dough such that fibrous food product with essentially aligned axial fibers egresses through said opening.

48 Claims, 10 Drawing Sheets

FIBROUS FOOD PRODUCT AND METHOD AND DEVICE FOR ITS PRODUCTION

This application is a 371 of PCT IL 98/00457 filed on Sep. 17, 1998.

FIELD OF THE INVENTION

The invention is generally in the field of food product and concerns fibrous food product, method for its production and device and assembly therefor.

BACKGROUND OF THE INVENTION

There have been many attempts in the food industry to produce food products with high contents of plant proteins, having a fibrous appearance and texture.

Israel Patent No. 80207 proposes a small-batch process for producing a meat analog from vegetable proteins, wherein a dough comprising at least 20% vital wheat gluten is prepared, the dough is heated and allowed to expand in three dimensions such that the swelling increases by at least 35% and then the dough is oriented by allowing it to expand only in one direction in which there is a reduction in a cross-sectional area of the expanding mass.

U.S. Pat. No. 4,910,040 proposes a continuous process, which is alleged to yield a protein product having aligned fibers. In this process a dough is prepared, and then pushed by a screw feeder through a first cylindrical passageway where the dough is allowed to relax, a second passageway with a decreased cross-sectional area and then through a third elongated passageway. In this third passageway the dough is heated to set the food product.

U.S. Pat. No. 5,061,507 proposes a process for the production of food products from potato materials and protein. Similarly as in U.S. Pat. No. 4,910,040, the dough is pushed, by a screw feeder with a decreasing cross-sectional area and then through an additional elongated passageway in which the mass is heated so as to set the food product.

GENERAL DESCRIPTION OF THE INVENTION

The following are meanings of some terms use of which will be made in the description below:

The term "food product" is used herein to denote both processed or semi-processed food products. A semi-processed food product may be subject to further processing stages in order to yield the final product For example, in accordance with the invention, a fibrous product is produced, which is a "foodproduct", and may thus either be consumed as such or it may be further processed, e.g. flavored, colored, mixed with other ingredients, shaped, cut minced, fried, etc., to yield a finished food product.

The term "fibrous food product" is used herein to denote a food product comprising fibers, particularly such which are macroscopic and thus affect the texture and appearance of the food product. A food product of the invention comprises continuous bundle of fibers, which are made of or comprise food proteins. These fibers were newly formed and fixed in the food product during its preparation and were thus not present in the dough from which the food product was prepared. The fibers in the food product of the invention resemble those of meat. In addition, in a fibrous food product of the invention, at least immediately after it is prepared, the fibers are substantially axially oriented and aligned. Obviously, if the food product is further processed, e.g. by cutting, mincing, flattening etc., the aligned orientation of the fibers may be altered.

The term "dough" is used herein to denote a mixture of food ingredients including protein, carbohydrate source and water, optionally in combination with one or more of oil, textured inert food product, flavoring agents (salt, spices, etc.) coloring agents and others. The dough is plastically deformable and is used for the preparation of the fibrous food product.

In accordance with the present invention a novel fibrous food product is provided. The fibrous food product of the invention is produced from a dough, which may be processed by forcing it through a passageway having a decreasing cross-sectional area towards a relatively narrow opening at the end of the passageway. (This passageway will be referred to herein at times as "the forming passageway"). During its passage through the forming passageway beat is transferred to the moving dough mass. It may be transferred to the entire dough in the passageway or only to that portion of the dough contained within a section of the forming passageway, typically a section adjacent the opening. The movement and the heat transfer in the forming passageway, yields the formation of aligned substantially axial fibers present in the food product egressing through the opening. The novel fibrous food product egressing through the opening thus comprises substantially axially aligned fibers. These fibers in the formed fibrous food product are newly formed and fixed fibers, not present in the dough from which the food product was prepared.

This novel fibrous food product comprises aligned bundles of fibers. Said bundles in the food product are continuous in that many of them, typically the majority, extend between two ends of the food product. In fact, the food product has a structure, resembling that of meat in that many of the fibers in the bundles are themselves comprised of a bundle of sub-fibers, and at times, each such sub-fiber may be comprised of a bundle of sub-fiberlettes. The fibers show some cohesiveness in that they stick to one another, but are nevertheless separable. As a result of its unique fibrous structure, the food product has a textural eating quality, including its chewiness, juiciness and its bite resistance, resembling that of meat.

The present invention thus provides, by a first of its aspects, a food product comprising continuous aligned bundles of formed fibers extending between ends of the food product.

The term "formed fibers" should be understood as meaning fibers in the food product which did not exist as such in the starting food ingredients, e.g. the dough, from which the food product was prepared.

The food product of the invention is produced from dough with the fibers being newly formed and fixed during the production of the product. By one embodiment, the food product of the invention is an elongated food product having an essentially uniform cross-section throughout its length. Particularly the elongated food product may be formed initially as a long continuous product egressing from an opening of a device where it is formed. Such an elongated food product may have theoretically an infinite length; but from practical production may be cut into sections for further processing. For example, the elongated food product may be allowed to elongate to a length above 20 cm, at times above 50 cm and at times even above 100 cm or even longer, before being sectioned, and then cut into stretches, e.g. having each a length within the range of 10–100 cm, for further processing. In accordance with another embodiment, the food product is a product obtained by processing said elongated food product Such processing may be cutting, (lengthwise or transverse), flattening, chopping, mincing, shaping, etc.

In accordance with another of its aspects the present invention provides a process for preparing a fibrous food product comprising:

(a) preparing a dough;

(b) forcing the dough to move along an axis extending through a passageway towards an axial opening at a far end of the passageway, the passageway having walls converging from a proximal end to said opening at said far end;

(c) transferring heat to at least that portion of the moving dough proximal said second end and controlling the heat transfer and speed of movement of the dough such that a fibrous food product with essentially aligned axial fibers egresses through said opening; and (d) collecting said food product.

In step (b), the dough is preferably forced to move in a uniform smooth manner.

In accordance with a further aspect of the invention there is provided an apparatus for preparing a fibrous food product, comprising:

(i) a passageway extending along an axis and being defined by walls converging from a proximal end of the passageway to an opening at a far end of the passageway;

(ii) a forcing mechanism for forcing the dough to move through said passageway between said proximal end to the opening at said second end; and (iii) a heating unit for dough contained in at least a portion of said passageway;

the movement and the heating of the dough being at a rate such so as to obtain gradual setting of the dough whereby a food product egresses through said opening having a fibrous structure with essentially aligned axial fibers.

According to a still further aspect of the invention there is provided an assembly for producing a fibrous food product comprising a plurality of said apparatuses.

The transfer of heat to the moving mass of dough in the forming passageway may be by a variety of heating means. Heating applied from a heating element disposed in the wall or being adjacent the walls (such a heating means will be referred to herein at times as "wall heating") being preferred. However, in addition to wall heating, it is possible also to heat the moving dough mass by Ohmic heating (namely by passing electric current through the dough); by means of microwave radiation: and other heating means or any combination of heating methods (e.g. combined wall heating and Ohmic heating). The heating causes the dough to begin to set (namely to undergo an irreversible change in theological properties). There is a temperature gradient between the portion of the dough which is adjacent the wall of the passageway and that which lies closer to its central axis within its lumen, which gradient obviously decreases at regions closer to said second end (where the cross-sectional area is smallest). Without wishing to be bound by theory, it is believed that this differential heating, which yields faster setting and thus a slower flow in the periphery close to the side walls, as compared to the inner regions of the flowing mass, gives rise to longitudinal shear forces which eventually lead to the formation of aligned fibers in the egressing food product.

As will be appreciated, the temperature of the heated dough portion moving through the passageway depends both on the rate of movement as well as on the rate of heat transfer into the dough. It was found in accordance with the invention that best results in terms of fiber formation are achieved when the temperature at the center of the heated moving dough portion (this temperature to be referred to at times as "core temperature") is at least about 93° C. Thus the temperature and the speed are preferably controlled so as to yield a core temperature of at least about 93° C. However, as will also be appreciated, the temperature should not be too high as this may cause rapid setting of the dough and clogging of the passageway. Furthermore, excessive heating may also burn the food product. Where heat transfer is achieved by wall heating the wall temperature should preferably be less than 150° C., typically less than 120° C.

The opening at the far end of the passageway man typically be circular but may also have other forms, e.g., elliptical, rectangular, hexagonal, etc. The opening will typically have a maximal dimension (e.g. diameter in the case of a circular opening or diagonal in the case of a rectangular opening) which is typically less than about 50 mm, preferably less than about 40 mm. Pushing the dough through the passageway with such an opening is typically at a rate and with a suitable force so as to yield an egression rate of the fibrous food product through said opening of about 0.2–5 cm/min. preferably of about 0.5–2 cm/min.

The forming passageway is preferably elongated, namely it has a length measured along its axis, which is larger than its diameter in its proximal end. The forming passageway is typically frustoconical although it may have other suitable shapes, e.g. the walls may be curved, etc. The heating unit of the apparatus is typically arranged such so that the portion of the dough which is heated is that portion contained within a segment of the forming passageway proximal to said opening. In the case of wall heating this means that the heating element is disposed in or adjacent a wall portion proximal to said opening.

The forming passageway preferably has internal walls treated or coated in a manner so as to render them smooth and to avoid adhesion of the dough thereto. For example, the internal walls of the forming passageway may be coated with Teflon.

The apparatus according to the invention for preparing the fibrous food product may have a variety of different shapes and forms. In accordance with one embodiment the apparatus comprises a feeding cylinder having an internal diameter essentially the same as that of the proximal end of the forming passageway, with one end of the cylinder being attached, in a fixed or in a detachable manner, to the proximal end of the forming passageway. Forcing the dough into the forming passageway may be achieved, in accordance with this embodiment, by a piston reciprocating within the cylinder. By one example of this embodiment, the apparatus has a general vertical orientation, with the feeding cylinder being on top of said passageway, and having its other end connected to a dough receptacle for receiving and holding dough and allow its subsequent entry into the feeding cylinder. In the feeding cylinder, the piston reciprocates between a retracted position in which the piston is entirely outside the cylinder, thus allowing dough from the receptacle to enter into the cylinder (typically by gravitation), and a fully extended position of the piston within the cylinder. The piston's cycle of operation then includes a slow forward movement towards the piston's fully extended position, and then a relatively rapid movement in the reverse direction to allow entry of a new dough mass into the cylinder.

By another example of said one embodiment the other end of the feeding cylinder may be sealed, with the cylinder's interior being divided by the piston into a dough-containing chamber, which is a chamber proximal to the forming passageway, and a pressure chamber. The pressure chamber is connected to a source of pressurized fluid, and the pressurized fluid entering the chamber thus generates force on the piston to induce movement of the dough. In this latter example, the general orientation of the device, (i.e. the combination of the passageway and the feeding cylinder) may be vertical, horizontal, or may have any intermediate orientation.

By another embodiment, the dough may be-forced to move into and through the forming passageway by means of a feeding pump, e.g. a peristaltic pump.

It may, however, be appreciated that the embodiments specifically mentioned herein are not intended to be limiting and should be regarded as examples only. As can be readily appreciated by the artisan, there are many other configurations of a device in accordance with the invention having features as defined above.

As already pointed out above, the flow rate should be relatively slow to allow formation of the fibers. However, the flow should not be too slow, as a flow rate, which is too slow, may cause hardening and setting of the food mass to an extent so as to clog the opening and the passageway. The artisan should have no difficulties, based on the teaching of the invention, to adjust the flow rate of the dough and the temperature such that a continuous fibrous food product will be obtained.

In accordance with one embodiment, the opening has a circular cross-section and accordingly the egressing fibrous food product egresses as a continuous cylindrical mass. Such a mass may be cut or sliced transversely or longitudinally, may be minced, e.g. to form minced meat analog, it may be flattened, etc. The opening may also have shapes other than circular, e.g. it may be rectangular, be oval, elliptical, etc. Additionally, the opening may have the form of an annulus and accordingly the mass egressing from the opening will have an initial overall tube-like structure (i.e. an annular cross-sectional shape)

The egressing fibrous food product may also be cut immediately at the opening, e.g. by means of wires tightly suspended across the opening. The wires may be arranged to cut the food product into longitudinal continuous slices, or in any other desired way. Where the product from the opening as a tube-like shaped mass, cutting it longitudinally in half, will in fact yield two planar masses, each of which can then be cut individually into unitary food items.

Each apparatus is typically designed to produce only a relatively small amount of a fibrous food product, e.g. about 0.3–10 kg/hr, preferably about 0.5–1.5 kg/hr. In order to allow mass production, an assembly may be provided comprising a plurality of such devices, e.g. arranged in a linear or a two-dimensional array, arranged in a circle, etc. Such an assembly may comprise a central feeding unit to feed dough into the receptacles and a central collecting unit. e.g. a conveyor belt for collecting the fibrous food products egressing from the plurality of devices. Furthermore, in such an assembly the mechanism for forcing the dough through the passageway of all apparatuses may be combined or each apparatus will have an independent forcing mechanism.

In the following, concentrations of various ingredients will be given by "percent", which is in w/w units, namely the number of unit weight of certain ingredients per 100 unit weights of the entire composition.

The dough is typically prepared by mixing a mass comprising undenatured food protein with water. The food protein may be obtained from a variety of sources. For example, it may be a vegetable protein, e.g. from cereals or corn. Additionally, other proteins may be added for functional and nutritional purposes. The undenatured protein may typically be vital gluten, vital wheat gluten being preferred. Particularly preferred is a vital wheat gluten product, which comprises, based on the dry weight of the product, at least about 50% protein, but typically about 70%–80% protein. A vital wheat gluten product may be obtained from a variety of commercial sources and typically comprises other ingredients such as carbohydrates, small amounts of fibers and some moisture.

Gluten may be included in the dough in a concentration range of about 20%–100%, of the total weight of the non-water ingredients (i.e. all ingredients excluding water). A preferred concentration range of gluten out of the non-water ingredients is 25–85%, about 45–80% being particularly preferred.

The dough may comprise protein from more than one source. For example, one vegetable protein may be gluten and the other may be Soya protein. A Soya protein product, typically comprises, based on dry weight of this product, about 50%–90% protein. Such a Soya product may be included in the dough in a concentration range, based on the total weight of the non-water ingredients, of about 2–20%, typically of about 5–12% and preferably of about 6–8%.

In addition, the dough may also comprise a source of carbohydrates. Some carbohydrates will be included in the vegetable protein products, e.g. in the vital wheat gluten products or the Soya protein products, but the dough may be supplemented also with additional carbohydrate sources such as for example, starch or flour. A particular example of a carbohydrate source is wheat flour (which also contains some proteins). Wheat flour may be included in the dough in a concentration range, based on total weight of non-water ingredients, of about 0–30%, typically about 2–20%, preferably about 5–15%.

The dough may also comprise oil, preferably vegetable oil, e.g. at a concentration of about 1–15%, based on the total dough weight (i.e. including the water).

The dough may obviously comprise a variety of flavoring and or coloring agents typically included at a concentration range, based on the total dough weight, of about 0.1–6%.

In order to prepare the dough, all the above non-water ingredients are mixed with water. The water content may be in the range, based on the total dough weight, of about 40–70%, typically in the range of about 45–65%, and preferably about 50–60%. During preparation of the food product a small amount of the water, e.g. about 1–3%, may evaporate.

The dough may also comprise a variety of food particles, namely, particles of an edible and textured food product which may be introduced into the dough but have little, if any, role in determining the properties of the dough as well as in the formation of a fibrous food product therefrom. The food particles are introduced into the dough typically with the intention that they remain as such in the subsequently formed fibrous food product; namely, to appear in the prepared food product essentially in their original form and texture without a substantial change during the preparation process. Examples of food particles are textured vegetable protein (TVP), e.g. Soya flakes or particles; whole vegetable products, e.g. peas, corn or other cereal grains; cut vegetables, e.g. carrot cubes or cubes of other vegetables; meat particles, preferably of already cooked meat; etc.

A preferred food product of the invention is a simulated meat product (a meat analog). Such a simulated meat product of the invention may be made for both human and animal consumption.

The invention will now be illustrated with reference to some non-limiting specific embodiments shown in the annexed drawings.

BRIEF DESCRIPTION OF THE DRAWINGS:

FIG. 6 is a schematical representation of the manner of processing an elongated fibrous food product, such as that shown in FIG. 1, into a plurality of flattened food products:

DETAILED DESCRIPTION OF A PREFERRED EMBODIMENT

Figure 1:
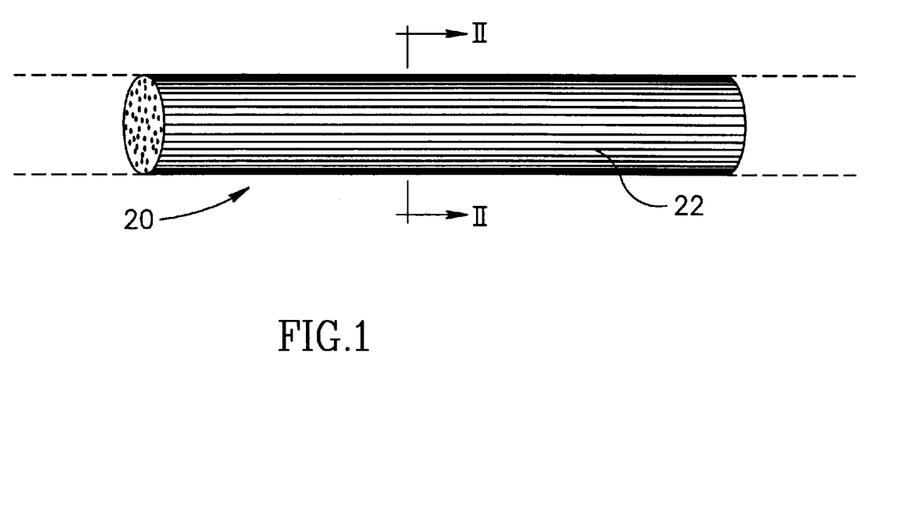
FIG. 1 is a schematic illustrative side view of an elongated fibrous food product in accordance with the invention.

Reference is first being made to FIG. 1 which is a schematic illustration of a food product in accordance with an embodiment of the invention generally designated 20, which is an elongated continuous food product in the form in which it egressed from a forming nozzle of a device for preparing the food product. Food product 20 has continuous bundles of fibers 22, which are aligned and axially oriented. The food product, in this form, can in fact be regarded as an infinite, continuous food product, the term "continuous" meaning that the production process of the product is such that it is continuously lengthened. The bundles of fibers 22 can be viewed as extending essentially to infinity in that as long as the product is being produced and lengthened, they are also being lengthened. A schematic cross-section through the food product 20 can be seen in FIG. 2. In this cross-section, in addition to a plurality of bundles of fibers 22 (which are drawn out of scale), also a thin skin 24, which typically forms at the periphery, as well as a food parti26, embedded in the food product 20 can also be seen. Food particle 26 may, for example, be a pre-cooked vegetable particle, e.g. pea, carrot, etc., TVP, a meat particle (typically pre-cooked), etc.

The food product of the invention, with appropriately added flavoring and/or coloring agents, can be a meat analog. Such agents can be added and subsequent process steps can be designed, to make the product into a meat analog resembling a chicken breast, beef cubes, etc.

Figure 3:
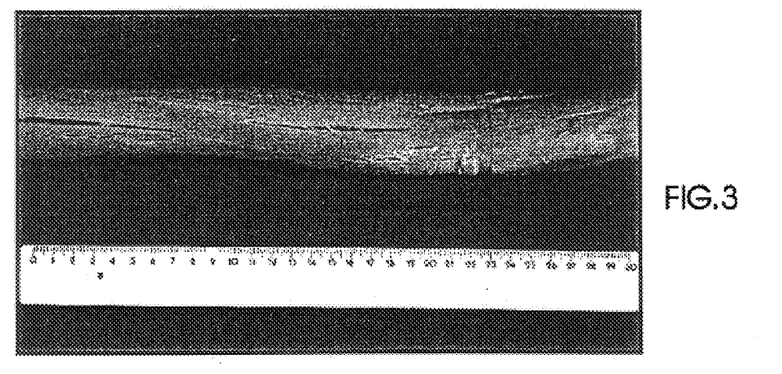
FIG. 3 is a photograph of an elongated fibrous food product in accordance with the invention.
Figure 4:
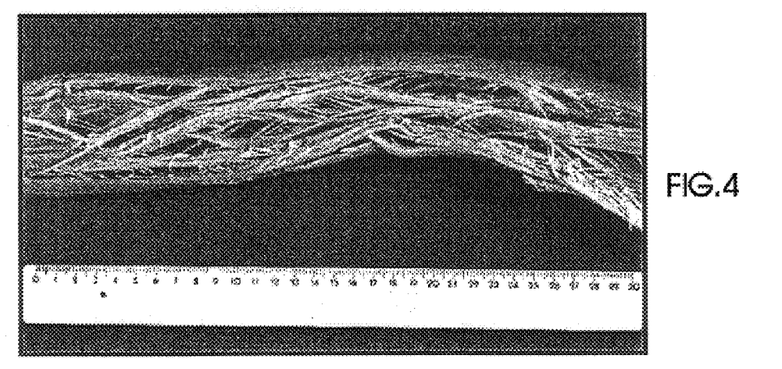
FIG. 4 shows the food product of FIG. 3 after making a cut through its skin and pulling the two cut edges away from one another to reveal the internal fibrous structure.
Figure 5:
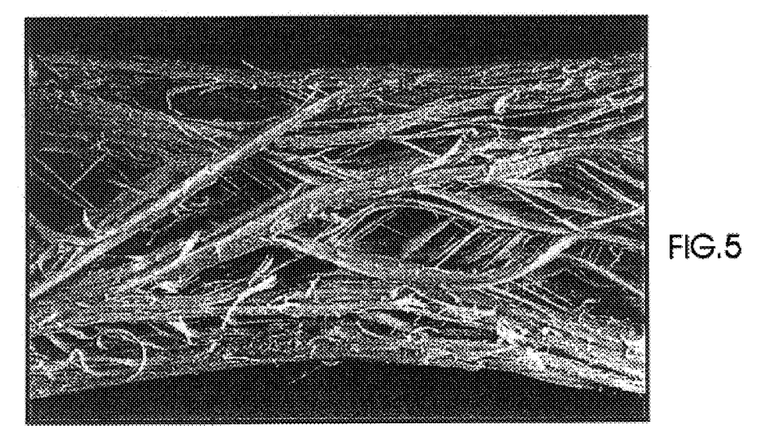
FIG. 5 is an enlargement of a section of FIG. 4.
Figure 6A:
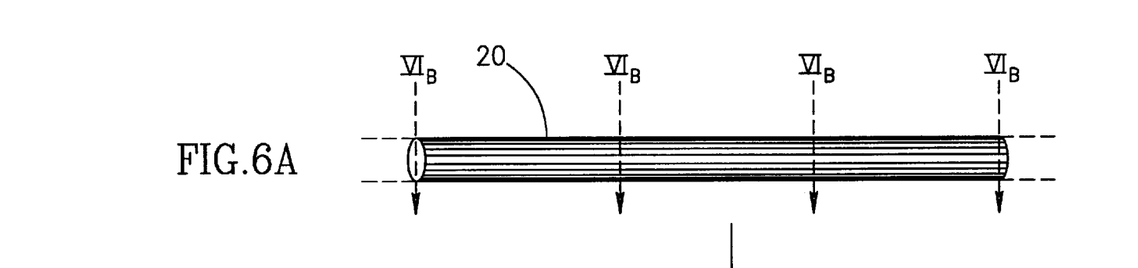
FIG. 6A shows the original elongated food product.
Figure 6B:
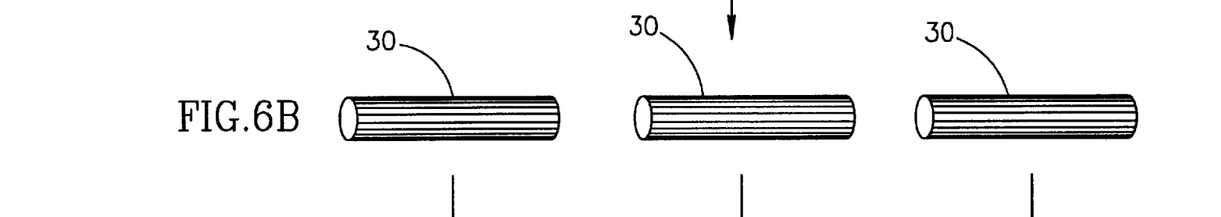
FIG. 6B shows the food product after transversely cutting along the lines marked $VI_B$.
Figure 6C:
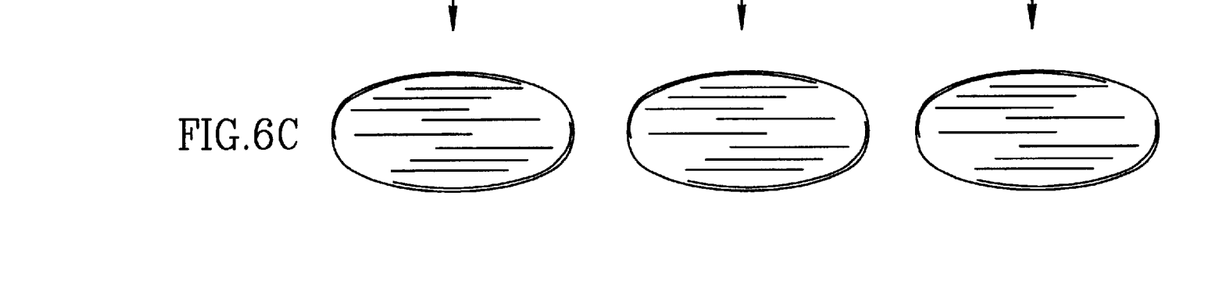
FIG. 6C shows the individual food produced item after they have been flattened.
Figure 6D:
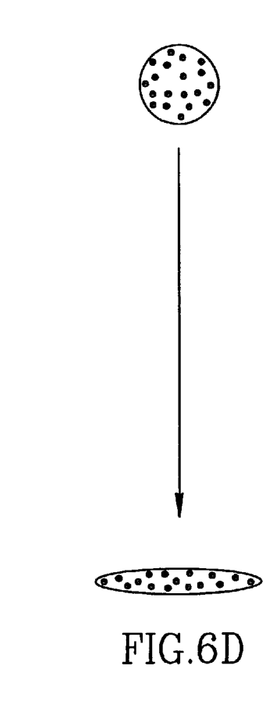
FIG. 6D shows a transverse cross-sectional view of the food product shown in FIG. 6A and that obtained in FIG. 6C.

Reference is now being made to the photographs shown in FIGS. 3, 4 and 5. The fibrous food product in this case is in the form of an elongated cylinder having a width of about 40 mm (see the centimeter scale at the bottom of FIGS. 3 and 4). The fibrous structure of the product is apparent even when viewing the product from the outside, in the view of FIG. 3, with the peripheral fibers joining together to form a skin. The fibrous structure is particularly apparent by making a longitudinal cut through the skin and then a "opening" the product to reveal its interior, as seen in FIGS. 4 and 5. As can be seen, particularly in FIG. 5, the fibers are arranged in bundles of various sizes, which are essentially axially oriented. Given the manner in which the food product is opened, the axial orientation of the upper bundles has been somewhat distorted and some, otherwise continuous fibers have been cut by the opening; however, the bundles seen close to the skin and deeper within the product, are clearly axially aligned.

Figure 2:
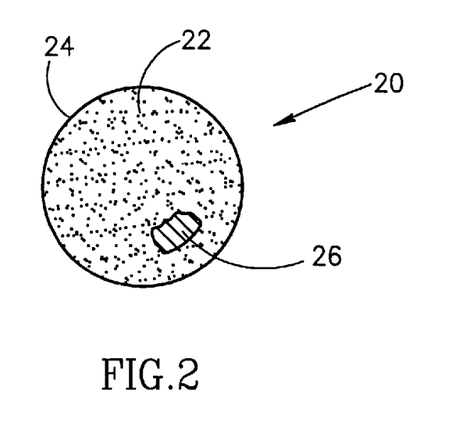
FIG. 2 shows a cross-section through lines II—II in FIG. 1.

An example of the manner of further processing of a food product of FIGS. 1 and 2, is shown in FIG. 6. The elongated food product 20 seen in FIG. 6A is cut along transverse lines $V_B$, to yield discrete food products 30 shown in FIG. 6B. Food product 30, can then be consumed as such, or alternatively, can further be processed by flattening into a flattened food item shown in FIG. 6C. The flattening process can also be appreciated from FIG. 6D, from which it can be seen that the product, which has initially a circular cross-sectional shape, assumes, after this processing sequence, a flattened shape with partially separate and somewhat reoriented bundles of fibers. In addition to such a manner of processing, the food product may also be further processed by mincing, cutting it into cubes (e.g. goulash analogs), fried. etc.

An apparatus in accordance with an embodiment of the invention, for preparation of a food product of the invention is illustrated in FIGS. 7A–7D, in four consecutive operational steps. The apparatus, generally designated 40, is vertically oriented and has a dough receptacle 42, a feeding cylinder 44 and a frustoconical forming passageway 46. Fitted around passageway 46 is a heating device 47 accommodating a heating element 48 and having a heat sensor 49 which is part of the control mechanism for controlling the heat generated by element 48. The device further comprises a piston 50, being at the bottom end of a rod 52, and having a flexible peripheral rim member 53 which is snugly accommodated within feeding cylinder 44. The piston 50 can move downward within feeding cylinder 44 thus pushing dough 54 contained within the cylinder, into forming passageway 46 such that a fibrous food product 56 egresses out of opening (or forming nozzle) 58, in a manner to be described below.

Figure 7A:
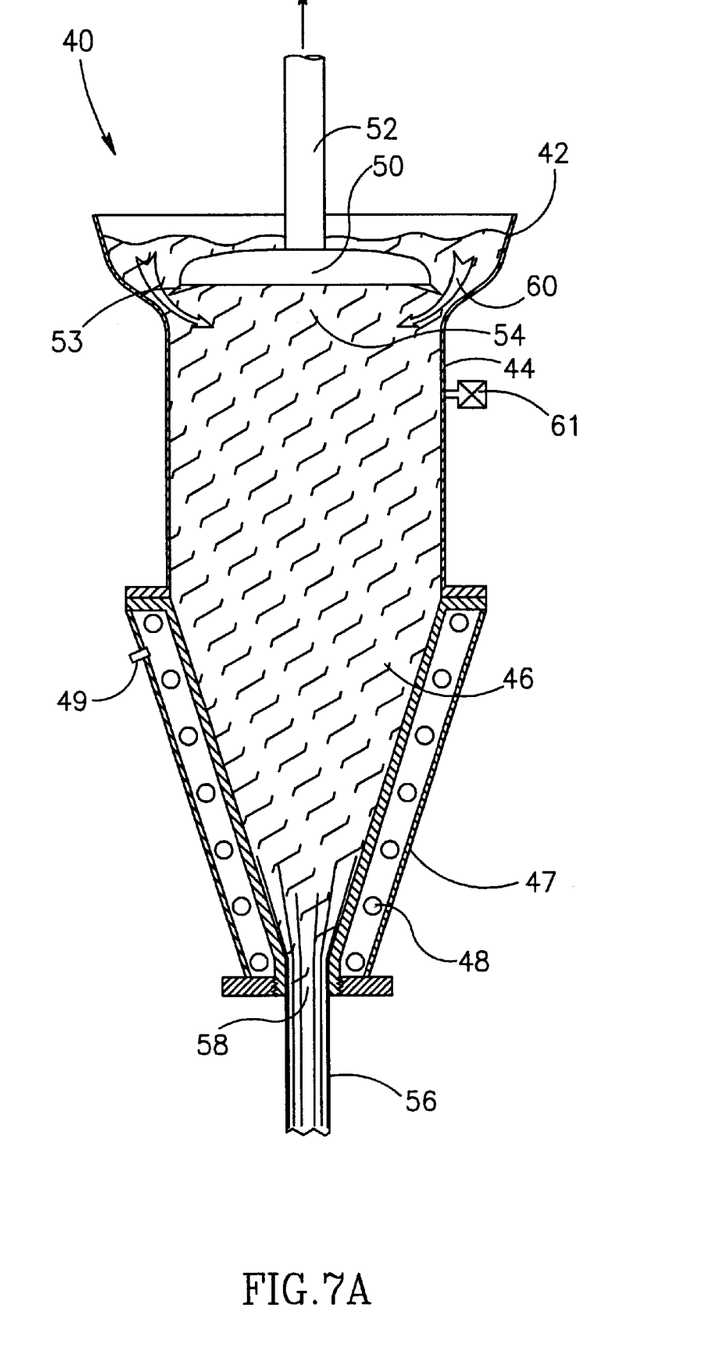
FIGS. 7A–7D show an embodiment of an apparatus for the preparation of a food product in accordance with the invention, in four operational states.
Figure 7B:
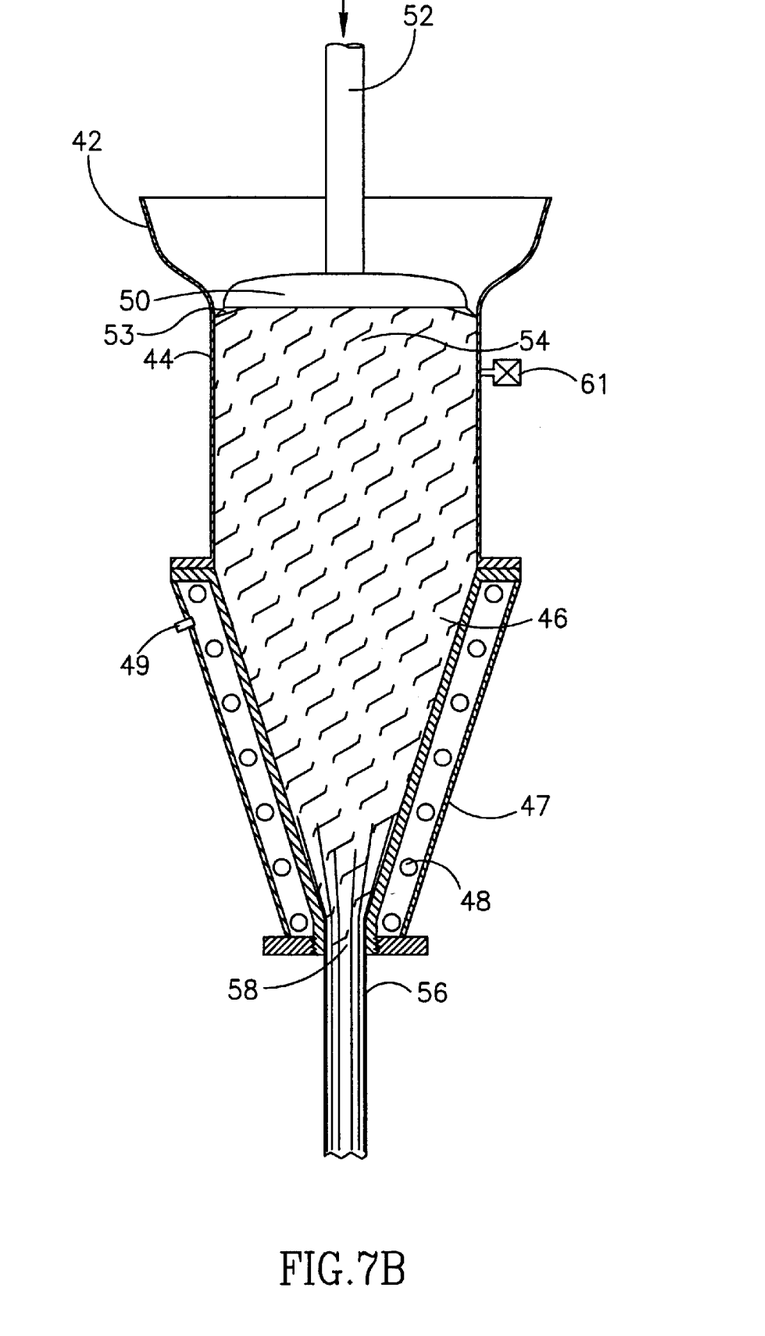
Figure 7C:
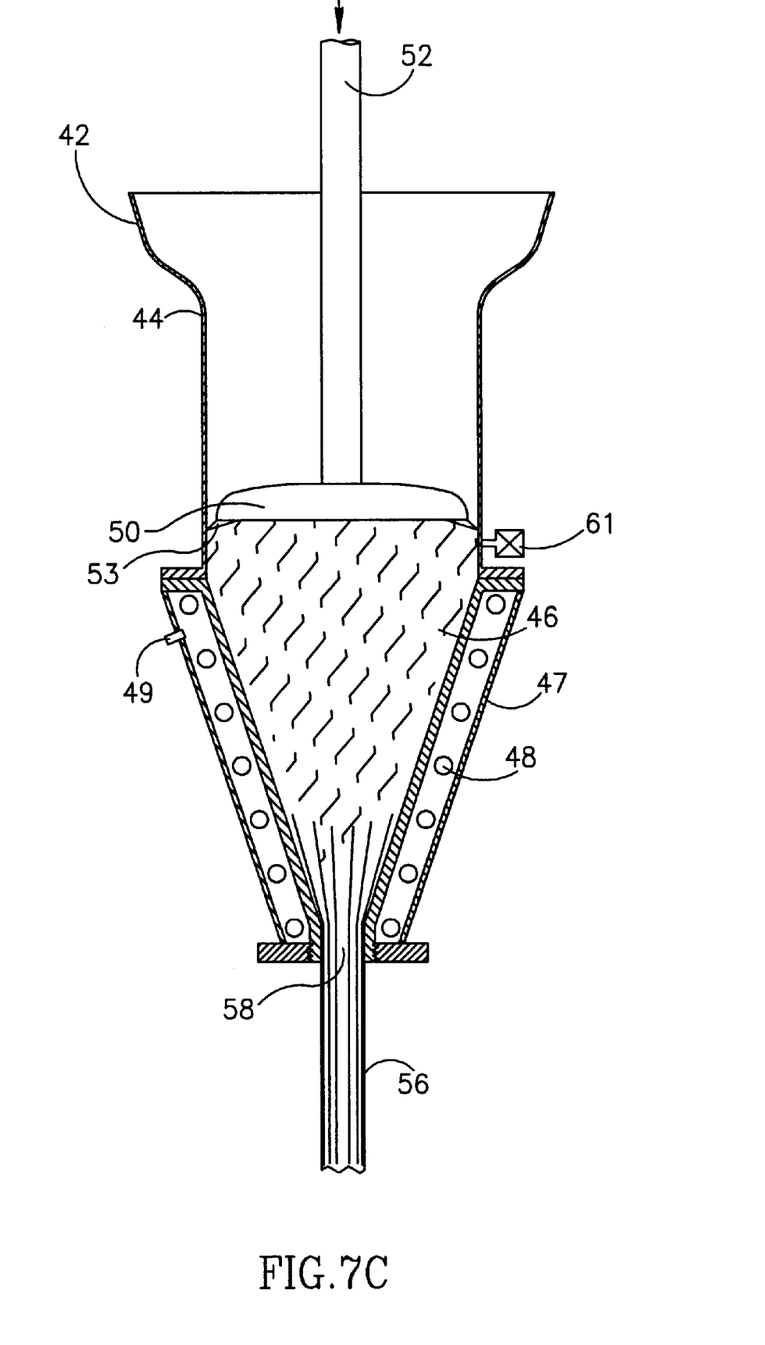
Figure 7D:
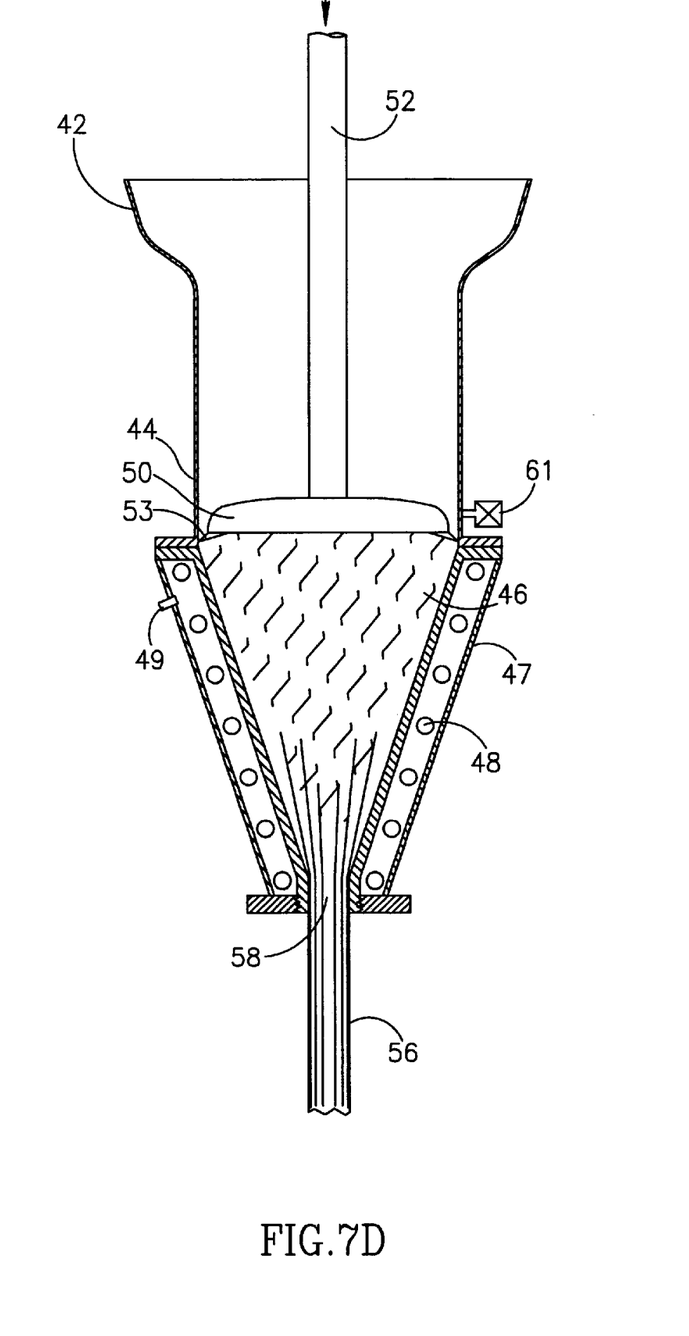

Apparatus 40 has a working cycle, which is schematically separated here into four consecutive steps, shown in FIGS. 7A–D. In the first step (FIG. 7A) piston 50 is moved to its fully retracted position whereupon a batch of dough, pre-filled into dough receptacle 42, falls into feeding cylinder 44, as represented by arrows 60. At a next step (FIG. 7B) the piston is moved downwards into feeding cylinder 44 and then begins a slow downward movement (FIGS. 7B and 7D) until reaching to about the bottom of feeding cylinder 44 (FIG. 7D). Then, cylinder 50 is moved upwards, relatively rapidly, back to the initial position (FIG. 7A) and then another batch of dough, pre-filled into dough receptacle 42 is allowed to fall into feeding cylinder 44 and the cycle begins again. The continuity of the produced elongated food product is ensured by the relative rapid upward movement (e.g. about 1–2 min.) of piston 50 from its fully extended position (FIG. 7D) to its fully retracted position (FIG. 7A), the short residence time (e.g. about 0.5–2 min.) in the fully retracted position and its again relatively rapid movement to the position where it begins its slow downward dough-forcing movement (FIG. 7B). Thus by way of illustration, the downward, dough-forcing movement of the piston, may last about 30–90 min., while the other sequences, namely the retraction and the short residence time in the retracted position, to allow refilling of the Cylinder with dough, and then at its initial downward movement lasting together about 14 min.

During the retraction of piston 50, a vacuum may form within feeding cylinder 44, which may disrupt the continuity of the process, and of the fibrous food product 56, In order to avoid this, venting mechanism may be provided, which allows gas entry and thus equalization of pressure during the retraction of piston 50. By one embodiment, such a venting mechanism is a one-way valve 61 disposed on the wall of feeding cylinder 44, which allows air flow only from the exterior to the interior and does not permit flow of fluid in the other direction. Another embodiment of a venting mechanism operates in the embodiment of FIG. 8, to be described below. In addition, from the beginning of the retraction phase of the piston and until it begins again its slow downward movement where it forces movement of the dough through forming passageway 46, no force is applied on the dough which remains stationary within forming passageway 46. In order to avoid burning of this dough portion, the heating is typically switched off during this phase.

This wall heating of forming passageway 46 by heating elements 48 causes differential setting in the dough between the periphery and the core. Without wishing to be bound by theory, it is believed that the differential setting may give rise to shear forces which may be involved in the formation of the axial fibers in food product 56 which egresses out of opening 58.

During its downward movement, the piston advances at a slow rate so as to slowly force the dough through forming passageway 46. The dimensions of the device are typically small, with the dimensions of forming passageway 46 being typically such that its volume is within the range of 0.1–1.5 liters, preferably within the range of about 0.2–1.0 liters. Typical dimensions of forming passageway 146 are a diameter at the proximal end of about 8–12 cm., a total length of about 15–20 cm., and a diameter at the opening of about 3–5 cm. By one embodiment of the apparatus the heating coil is fitted around a bottom portion of the device, e.g. a bottom portion consisting of about the bottom two-thirds of the forming passageway.

The downward movement of piston 50 is typically slow, such that the rate of production of the fibrous food product 56 in each such device is about 0.3–10 kg/hr, preferably about 0.5–1.5 kg/hr. Given the relatively small production rate of each apparatus 40 it is typically included in an assembly of such apparatuses, e.g. arranged in a linear or two-dimension array.

Figure 8:
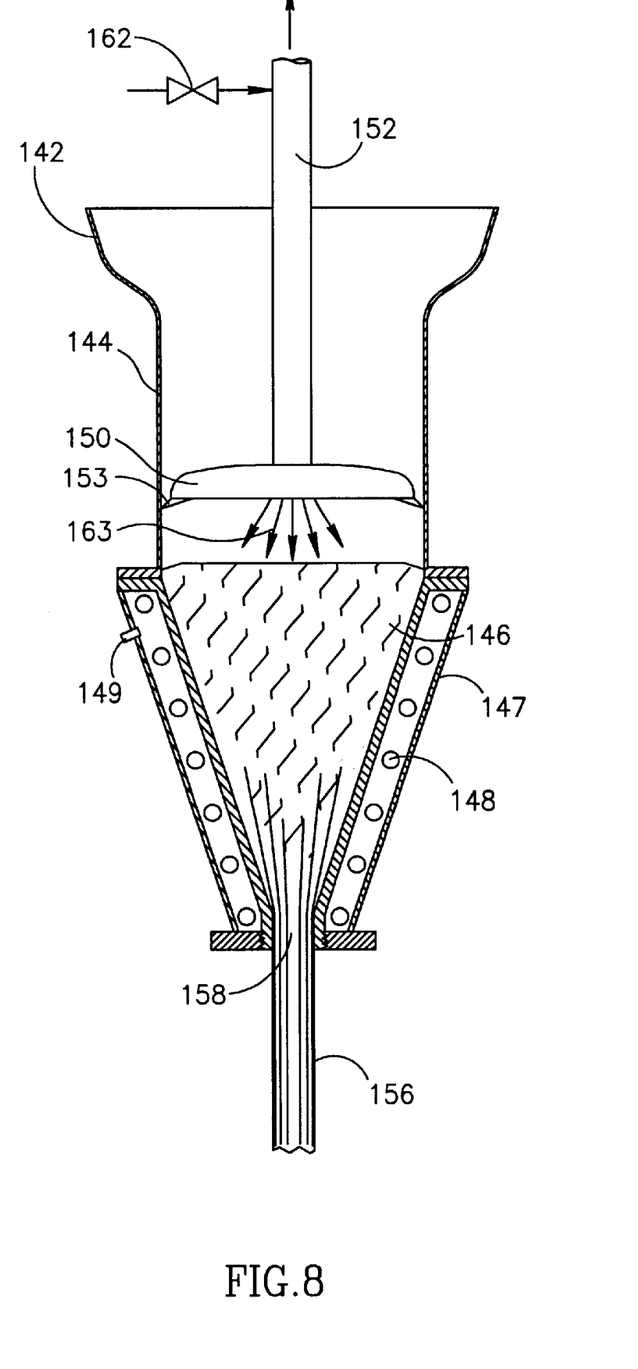
FIG. 8 shows another embodiment of an apparatus for the preparation of a food product in accordance with the invention.
Figure 9:
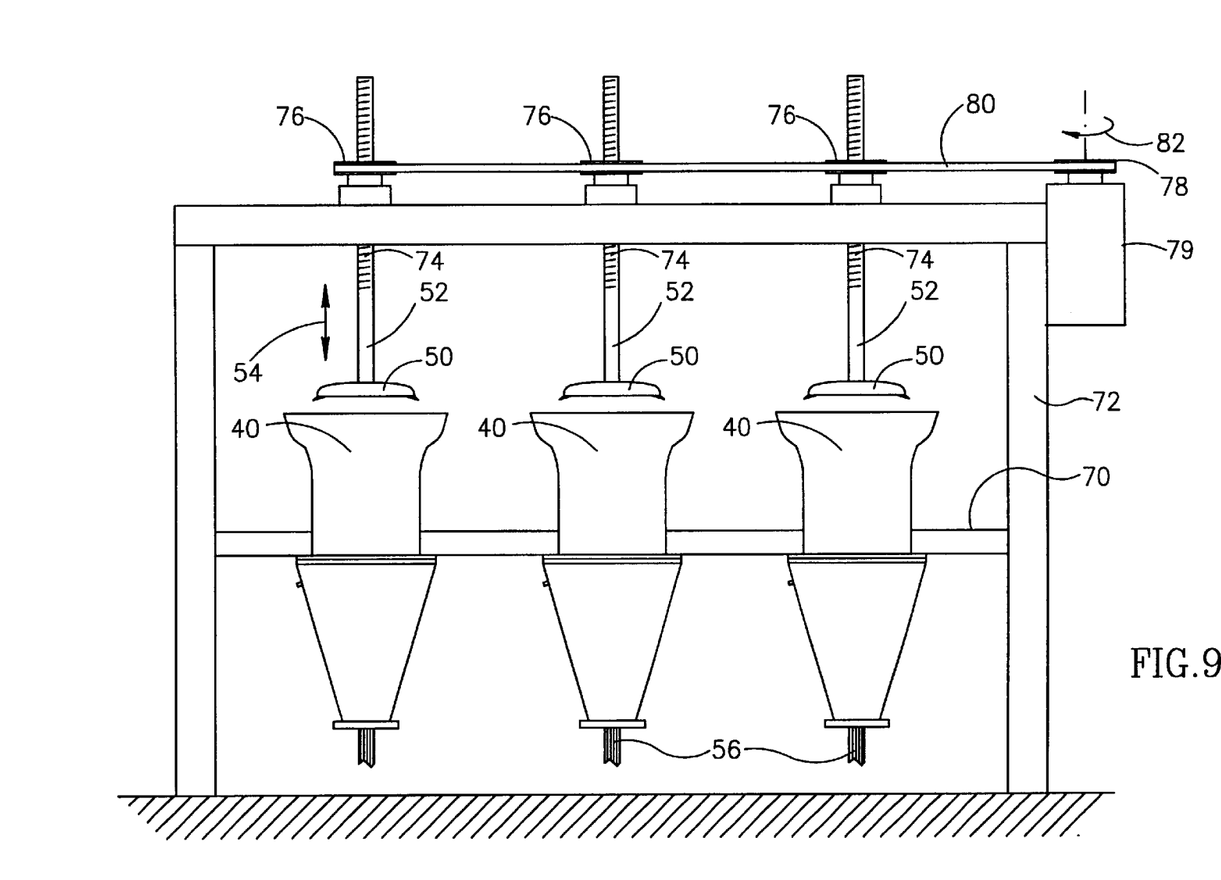
FIG. 9 shows an assembly of apparatuses of the kind shown in FIGS. 7A–7D.

Another embodiment of an apparatus in accordance with the invention is shown in FIG. 9. This apparatus has many similarities to the apparatus of the embodiment of FIGS. 7A–7D and thus like reference numerals to those of FIGS. 7A–7D, with a "1" prefix were used to designate like components (the reader is referred to the description above for an explanation of their function). The difference in the embodiment of FIG. 8 is in that the venting mechanism does not comprise a one way valve, such as valve 61 included in the embodiment of FIGS. 7A–7D; rather, in the embodiment of FIG. 8 a different venting mechanism operate including a pressurized gas source 162 (shown schematically herein), e.g. a pumping mechanism, for pumping gas through a conduit in piston rod 152 (not shown) into the feeding cylinder. During the upward movement of piston 152, gas originating from pumping mechanism 162 is permitted to flow through the conduit in piston rod 152 and then exits from the bottom of the piston into the forming cylinder as represented by arrows 163. During the downward movement phase of the piston the gas passage is closed.

A front view of such an assembly of apparatuses can be seen in FIG. 9. The assembly comprises a plurality of fibrous food production apparatuses 40, each of which may have a structure such as that of the apparatus shown in FIGS. 7A–7D. Apparatuses 40 are fitted in a support table 70 held by rack 72. Each of apparatuses 40 has an associated piston 50, with a vertical stem 52 having an upper screw-threaded portion 74 cooperating each with a wheel 76, which is internally screw-threaded (the internal screw-thread not shown), such that rotation of wheel 76 induces a vertical movement of the stem and its associated piston. All wheels 76 are coupled to wheels 78 of motor 79 by means of a cogged drive belt or chain 80. The revolution of wheel 78 by motor 79 (represented by arrow 82) is thus translated into a vertical movement of pistons 50 (represented by arrow 84.

In order to avoid adhesion of food mass to the walls of the forming passageway, the internal walls are typically treated, or coated, to make them less adherent. A typical, preferred embodiment is the coating of the internal walls by a heat resistant, polymeric material, preferably of a kind, which does not absorb moisture. A preferred polymeric material is tetrafluoroethylene polymer, known by its trade name Teflon. For the purpose of coating by Teflon, the forming passageway, typically made of aluminum, undergoes hard anodization followed by spraying with Teflon. In accordance with another example, internal coating may be achieved by the use of a thin-walled frustoconical insert having its internal walls coated with Teflon. Use of such an insert has an advantage when needing to retrofit an apparatus after extensive use, when the Teflon coating has worn out.

In order to reduce wear of the Teflon, it is preferred to introduce some lubricating edible oil, typically vegetable oil. This may be achieved, for example, by introducing some vegetable oil at the beginning of each operational cycle (prior to the beginning of a downward movement of the piston); or, alternatively, this may be achieved by nozzles disposed within the forming passageway which continuously, or intermittently introduce some oil to the internal walls of the forming passageway.

Figure 10:
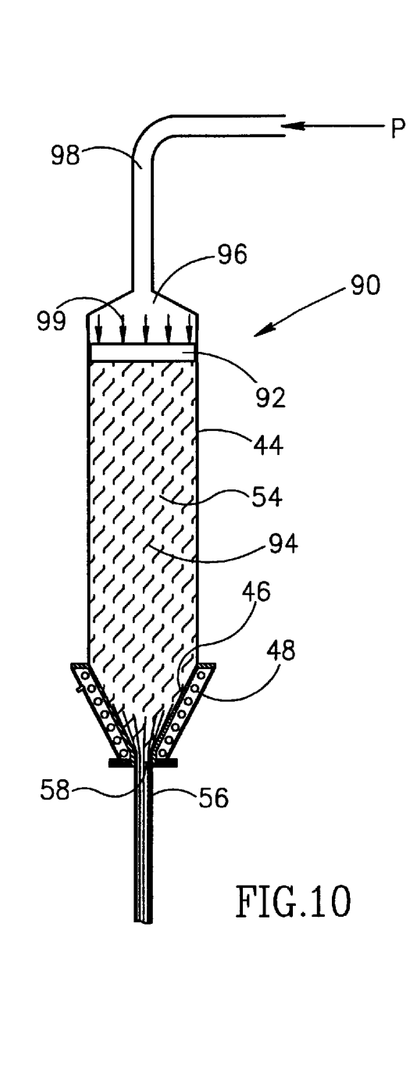
FIGS. 10 and 11 show two other embodiments of apparatuses for preparing a fibrous food product of the invention.
Figure 11:
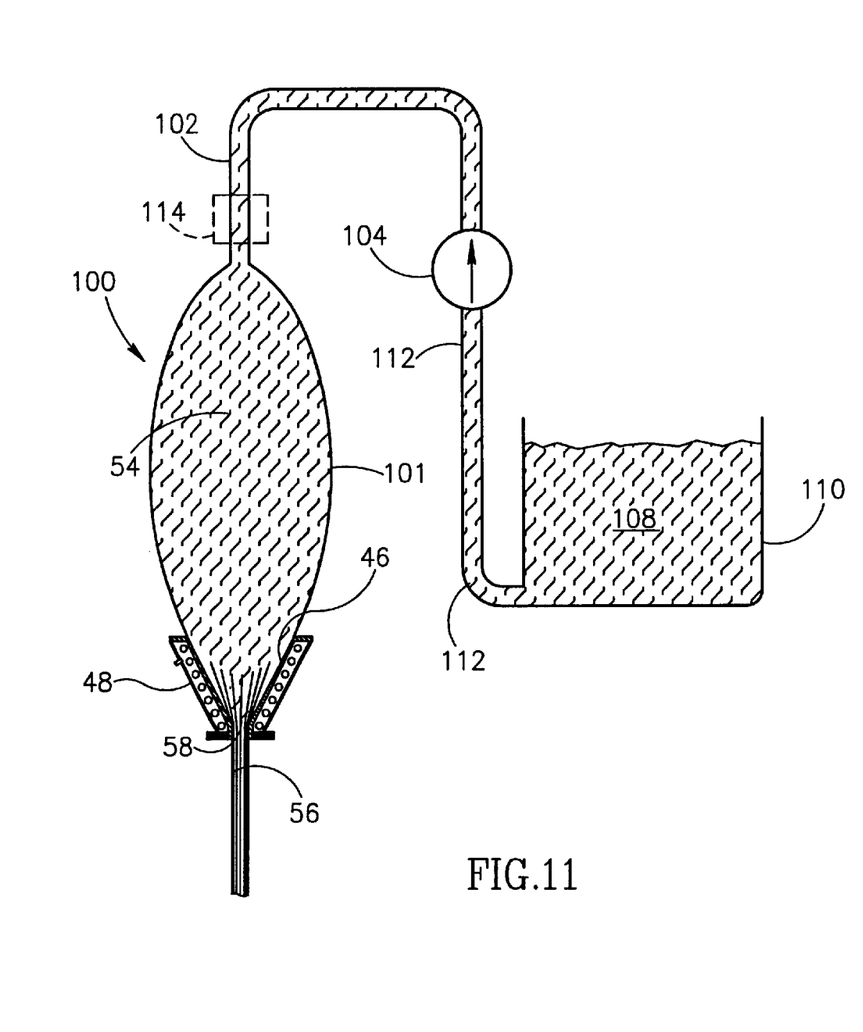

Two other examples of the manner of inducing smooth movement of the dough into and through the conical forming passageway) 46 can be seen in FIGS. 10 and 11. Apparatuses 90 and 100 of the embodiment shown in FIGS. 10 and 11, respectively, have various components which are similar and which have a similar function to those of the embodiment of FIGS. 7A–7D; such components were give like numbers to those of FIG. 7 and the reader is referred to the description of FIG. 7 for explanation of their function. In the device 90 of FIG. 10, feeding cylinder 44 accommodates a piston 92 which divides the cylinder into a bottom, dough containing compartment 94 and an upper compartment 96, containing a fluid, e.g. air or water, provided through inlet duct 98. A pressurized fluid P enters through inlet duct 98 and thus applies force on piston 92, causing it to move in the direction of arrows 99, thus forcing dough 54 into forming passageway 46. As a result, similarly as in the embodiment of FIG. 7, fibrous food product 56 is produced and egresses through opening 58.

When using the apparatus 90, dough is supplied essentially in a batch-wise manner as once piston 92 moves the whole length of feeding cylinder 44, a new batch of dough 54 has to be added into feeding cylinder 44. Alternatively, empty feeding cylinder 44, which in this case is detachably attached to forming passageway 46, may be removed and then replaced by another such cylinder, pre-filled with dough 54. In either case the continuity of egressing food product 56 is ensured which food product has continuous bundles of fiber.

A fully continuous food process is possible in the case of the embodiment shown in FIG. 11. The apparatus 100 has a dough feeding chamber 101 into which dough 54 is continuously supplied through feeding line 102 comprising a peristaltic pump 104 which continuously draws from dough 108 held in container 110, through a drawing pipe 112. This arrangement thus ensures a continuous feeding of dough into forming passageway 46.

In an assembly comprising a plurality of apparatuses 100, each such apparatus may be fed by its own associated peristaltic pump 104. Alternatively, one such peristaltic pump can be made to feed dough into a plurality of apparatuses 100, in which case typically feeding line 102 will comprise a regulating valve 114 to ensure that the dough is provided in a uniform manner to each of a plurality of apparatuses 100.

While the design characteristics of the apparatus 40 in FIG. 7 require that it be placed in a vertical orientation, the apparatuses 90 and 100 can assume a different orientation, e.g. horizontal.

As will be appreciated, the apparatuses and the processes specifically shown herein are just examples of a myriad of fibrous food product preparation apparatuses and processes having the novel characteristics of the present invention. Thus, the invention should not be construed as being limited to the apparatuses and processes illustrated herein, or to a fibrous food product produced thereby, but rather these should be regarded as examples only of the fill scope of the invention as defined herein.

What is claimed is:

1. An elongated food product comprising bundles of newly formed fibers fixed during preparation of the food product with a majority of the fibers being continuous and extending between faces of the food product, said fibers being comprised of bundles of sub-fibers.

2. A food product according to claim 1, wherein said fibers are made essentially of gluten.

3. A food product according to claim 1, having a uniform cross-section throughout its length.

4. A food product according to claim 1, comprising substantially axially oriented bundles of fibers.

5. A food product according to claim 1, having a length above 20 cm.

6. A food product according to claim 5, having a length above 50 cm.

7. A food product according to claim 1, formed from a continuous essentially infinite food product eggressing from a forming nozzle.

8. A food product according to claim 1, wherein the fibers are both cohesive and are separable from one another.

9. A food product according to claim 1, having a textural equality resembling that of meat.

10. A food product according to claim 9, being a simulated meat product.

11. A food product according to claim 1, having a water contents of about 40–70%.

12. A food product according to claim 11, wherein the water contents is about 50–65%.

13. A food product obtained by further processing the food product of claim 1, said further processing comprises cutting, chopping, mincing or shaping.

14. An elongated food product comprising bundles of newly formed fibers fixed during preparation of the food product with a majority of the fibers being continuous and extending between faces of the food product, and a water contents of about 40–70%.

15. A food product according to claim 14, wherein the water contents is about 50–60%.

16. A food product according to claim 14, wherein said fibers are made essentially of gluten.

17. A food product according to claim 14, having a uniform cross-section throughout its length.

18. A food product according to claim 14, comprising substantially axially oriented bundles of fibers.

19. A food product according to claim 14, having a length above 20 cm.

20. A food product according to claim 18, having a length above 50 cm.

21. A food product according to claim 14, formed from a continuous essentially infinite food product eggressing from a forming nozzle.

22. A food product according to claim 14, comprising fibers which are comprised of bundle of sub-fibers.

23. A food product according to claim 14, wherein the fibers are both cohesive and are separable from one another.

24. A food product according to claim 14, having a textural equality resembling that of meat.

25. A food product according to claim 24, being a simulated meat product.

26. A food product obtained by further processing the food product of claim 14, said further processing comprises cutting, chopping, mincing or shaping.

27. A process for preparing a fibrous food product comprising:
   (a) preparing a dough;
   (b) forcing the dough to move along an axis extending through a passageway towards an axial opening at a far end of the passageway, the passageway having walls converging from a proximal end to said opening at said far end;
   (c) transferring heat to a portion of the moving dough proximal said second end and controlling the heat transfer and speed of movement of the dough such that a fibrous food product with essentially aligned axial fibers egresses through said opening; and
   (d) collecting said food product after its exit from said opening.

28. A process according to claim 27, wherein the dough's moving velocity and the heating rate of the heated dough portion are such so as to yield a temperature at an innermost zone of the heated, moving dough portion, of at least about 93° C.

29. A process according to claim 27, wherein the heat is provided through a heated wall section of said passageway by an element disposed within or adjacent walls of said segment.

30. A process according to claim 29, wherein said section is a section adjacent said opening.

31. A process according to claim 29, wherein the temperature of the heated wall section, is less than about 150° C.

32. A process according to claim 31, wherein the wall temperature is less than about 120° C.

33. A process according to claim 27, wherein said opening had a maximal dimension which is less than about 50 mm.

34. A process according to claim 33, wherein the food product egresses through the opening at a rate of about 0.2–5 cm/min.

35. A process according to claim 34, wherein the egression rate of the food product is about 0.5–2 cm/min.

36. A process according to claim 27, wherein the rate of production of the food product is about 0.3–10 kg/hr.

37. A device (40) for preparing a fibrous food product (50), comprising:
(i) a passageway (46) extending along an axis and being defined by walls converging from a proximal end of the passageway to an opening (58) at a far end of the passageway;
(ii) a forcing system (50,52) for forcing the doug received in a receptacle (42) to move through said passageway (46) between said proximal end to the opening (58) at said second end; and
(iii) a heating unit (47) for heating dough (54) contained within said passageway (46);
the movement and the heating of the dough (54) being at a rate such so as to obtain gradual setting of the dough whereby a food product egresses through said opening having a fibrous structure with essentially aligned axial fibers.

38. A device (40) according to claim 37, wherein said passageway (46) is frustoconical.

39. A device (40) according to claim 37, comprising a heating element (48) disposed within or adjacent the walls of a section of said passageway, such that heat is transferred to the dough through the walls of said section.

40. A device (40) according to claim 39, wherein said wall section is a section proximal to said opening (58).

41. A device according to claim 37, comprising a dough feeding cylinder (44) fixed to the proximal end of said passageway, with the dough being fed into said passageway (46) by a piston (50) moving within said cylinder.

42. A device (40) according to claim 41, having a vertical orientation, with the cylinder (44) being situated above said passageway (46), the cylinder (44) being fitted at its upper end with a dough receptacle (42), for receiving and holding dough (54) which subsequently enters into said cylinder (44) when the piston (50) retracts from the cylinder.

43. A device (90) according to claim 41, wherein the piston (92) divides the cylinder (44) into a first, dough-containing compartment (94) in communication with said passageway, and another, pressurized fluid-containing compartment (96), with the latter being in flow communication with a pressurized fluid source (P), such that the pressurized fluid exert force on said piston.

44. A device (100) according to claim 37, wherein said dough (54) is continuously forced into said passageway by a pump (104).

45. A device (100) according to claim 44, wherein the pump (104) is a peristaltic pump.

46. An assembly for producing a fibrous food product comprising a plurality of devices (40) according to claim 37.

47. A food product produced by a process of claim 27.

48. A process according to claim 27, the dough in step (b) is forced to move in a uniform smooth manner.

* * * * *